United States Patent Office 2,860,119
Patented Nov. 11, 1958

2,860,119

ALKYD RESINS, THEIR PREPARATION, AND COMPOSITIONS THEREOF WITH AMINOPLAST RESINS

John C. Petropoulos, South Norwalk, and Leonard E. Cadwell, Stamford, Conn., assignors to American Cyanamid Company, New York, N. Y., a corporation of Maine No Drawing. Application November 17, 1953
Serial No. 392,748

19 Claims. (Cl. 260—45.3)

This invention relates to novel alkyd resins and, more particularly, this invention relates to novel alkyd resins that are prepared by reacting phthalic acid or its anhydride with a polyhydric alcohol having the formula:

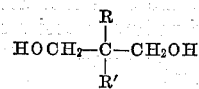

wherein R is a member selected from the group consisting of a —CH$_2$OH group, an alkyl group and an aryl group, R' is a member selected from the group consisting of alkyl and aryl groups wherein the number of carbon atoms in R and R' totals at least 6.

One of the objects of the present invention is to produce a novel alkyd resin by reacting phthalic acid or its anhydride with a polyhydric alcohol having the formula:

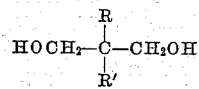

wherein R is a member of the group consisting of a —CH$_2$OH group, an alkyl group and an aryl group, R' is a member of the group consisting of alkyl and aryl groups, wherein the number of carbon atoms in R and R' totals at least 6.

A further object of the present invention is to produce alkyd resins of the class described that have improved properties with respect to color and gloss, color and gloss retention, alcohol, acid and alkali resistance, solvent resistance, and mar resistance.

These and other objects of the present invention will be discussed in greater detail hereinbelow.

In the past, it has been necessary to modify alkyd resins with a long chain saturated fatty acid in order to obtain xylol or xylol-butanol soluble alkyd resins prepared by reacting phthalic anhydride with such polyols as glycerine, pentaerythritol and trimethylol ethane. It was felt that the fatty acid modifier was necessary in order to permit satisfactory grinding of the vehicle with pigments. The fatty acids were further deemed necessary in order to improve the flow properties of the film of the alkyd resin, thus preventing the formation of irregularities in the film such as "pin holes" and "craters." Along with these improvements realized in using a fatty acid modifier, the fatty acids had certain adverse effects on the alkyd resins such as the diminution of the heat and the chemical resistance, since weak points were introduced thereby into the film. These weak points are generally considered to be the hydrogens on the alpha carbon to the carbalkoxy group of the fatty acid ester. The steric hindrance around the fatty acid carbalkoxy group is much less than that of phthalic anhydride and therefore the alkali and soap resistance is markedly decreased. The practice of the process of the present invention not only obviates the use of the fatty acid modifiers by imparting the desirable properties indicated hereinabove but it also improves the heat resistance and chemical resistance of the alkyd resin since the resins prepared according to this invention do not contain the previously discussed weak linkages. Still further, by practicing the principles of this invention, further improvement in the heat and chemical resistance are realized since other weak points commonly found in conventional alkyds are eliminated.

In the preparation of the alkyd resins of the present invention, one utilizes a polyhydric alcohol having the formula:

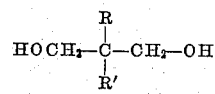

wherein R is a member of the group consisting of a —CH$_2$OH group, an alkyl group and an aryl group, R' is a member of the group consisting of alkyl and aryl groups, wherein the number of carbon atoms in R and R' totals at least 6.

Representative members of this class of polyhydric alcohols are 2-methyl-2-amylpropanediol-1,3; 2-methyl-2-hexylpropanediol - 1,3; 2 - methyl - 2 - nonylpropanediol-1,3; 2 - methyl - 2 - laurylpropanediol - 1,3; 2 - ethyl-2-butylpropanediol - 1,3; 2 - ethyl - 2 - heptylpropanediol-1,3; 2 - ethyl - 2 - decylpropanediol - 1,3; 2,2 - dipropylpropanediol - 1,3; 2,2 - dibutylpropanediol - 1,3; 2,2 - diamyl - propanediol - 1,3; 2,2 - dioctylpropanediol - 1,3; 2,2 - didecylpropanediol - 1,3; 2 - methyl - 2 - amylpropanediol - 1,3; 2 - methylol - 2 - hexylpropanediol - 1,3; 2 - methylol - 2 - decylpropanediol - 1,3; 2 - methylol - 2 - phenylpropanediol - 1,3; 2 - ethylol - 2 - butylpropanediol - 1,3; 2 - ethyl - 2 - heptylpropanediol - 1,3; and the like.

In order that the present invention may be more completely understood, the following examples are set forth in which all parts are parts by weight.

Example 1

Into a suitable reaction chamber equipped with thermometer, stirrer and reflux condenser, there is introduced 148 parts of phthalic anhydride, 34 parts of pentaerythritol, 120 parts of 2-ethyl-2-butylpropanediol-1,3. The charge is heated to and maintained at about 235° C., until esterification is substantially complete as determined by the acid number of about 10. The viscosity of a 60% solids solution of the resin in xylol is approximately $Z_2$–$Z_3$ on the Gardner-Holdt scale at 25° C. The Gardner 1933 color was less than one.

Example 2

Into a suitable reaction chamber equipped as in Example 1, there is introduced 148 parts of phthalic anhydride, 60 parts of trimethylol propane and 80 parts of 2-ethyl-2-butylpropanediol-1,3. The reaction mixture is heated to about 230–240° C. and maintained at that temperature until an acid number of 10–15 is reached which indicates that substantially complete esterification has taken place. The viscosity of a 60% solids solution of the resin in xylol is about Z–$Z_1$ on the Gardner-Holdt scale at 25° C. The Gardner 1933 color was less than one.

Example 3

148 parts of phthalic anhydride, 61 parts of pentaerythritol and 129 parts of 2-ethyl-2-butylpropanediol-1,3 are introduced into a suitable reaction chamber equipped as in Example 1 and the charge is heated at about 235° C. until an acid number of 5.6 is reached. The viscosity of a 60% solids solution in xylol is about $Z_2$ on the Gardner-Holdt scale at 25° C. The Gardner 1933 color was less than one.

Example 4

148 phthalic anhydride, 46.4 pentaerythritol, 98 parts of 2-ethyl-2-butylpropanediol-1,3 are treated according to the process as set forth in Example 1 until an acid number of 20 is reached. A 50% solids solution of the resin in a xylol-butanol 1:1 solvent has a viscosity of 0 on the Gardner-Holdt scale at 25° C. Again the color was less than one (Gardner, 1933).

Example 5

148 parts of phthalic anhydride, 225 parts of 2,2-dimethylol heptanol are introduced into a suitable reaction chamber equipped as in Example 1 and are heated until an acid number of about 5–10 is reached. A 60% solids solution of the resin thus produced in xylol had a viscosity of about $Z-Z_4$ on the Gardner-Holdt scale at 25° C. The color of the resin solution was about 1–2 (Gardner 1933).

Example 6

148 parts of phthalic anhydride, 252 parts of 3,5,5-trimethyl-2,3-dimethylol hexanol are introduced into a suitable reaction chamber equipped as in Example 1 and the mixture is heated until an acid number of 5–10 is reached. The viscosity of a 60% solids solution of the resin thus produced in xylol was $Z-Z_4$ and the Gardner 1933 color was 1–2.

Example 7

A mixture of the alkyd resin prepared according to Example 1 and a butanol modified benzoguanamine-formaldehyde resin containing in parts by weight 70:30, respectively, is prepared and films are drawn down and baked by a conventional baking method. Hard, mar-proof enamel films result which showed outstanding resistance to the following reagents: ethyl alcohol, 50% aqueous acetic acid, 20% aqueous sodium hydroxide, tincture of iodine, butyl acetate and xylol. Still further, these films exhibited excellent gloss and color retention even when exposed to high temperatures.

Example 8

Coating compositions were prepared by using 30 parts of a butanol modified melamine-formaldehyde resin with 70 parts of each of the alkyd resins prepared according to Examples 1, 2, 3 and 4. Films drawn down and baked from these compositions again showed hard, mar-proof, clear films which had outstanding film characteristics comparable to those displayed hereinabove with the benzoguanamine resin.

Example 9

A coating composition comprising 30 parts of a butanol modified urea-formaldehyde resin and 70 parts each of the alkyd resins prepared according to Examples 1, 2, 3 and 4 were prepared. Films drawn down therefrom again displayed outstanding characteristics when compared with the conventional alkyd-urea resin mixtures.

Each of these films of Examples 7, 8 and 9 were superior with regard to solvent resistance, gloss, color retention and color stability when compared with a commercially available enamel.

The alkyd resins of the present invention are particularly useful when mixed with solutions of aminoplast resins such as those prepared by reacting an aldehyde with an aldehyde-reactable amidogen compound such as urea, thiourea, dicyandiamide, an aminotriazine such as melamine, formoguanamine, ammeline, benzoguanamine, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine and 2,4,6-triethyl-triamino-1,3,5-triazine and the like. The mono-, di-, or triaralkyl or mono-, di-, or triaryl melamines; for instance, 2,4,6-triphenyltriamino-1,3,5-triazine and the like. These aminoplast resins are preferably those which are alcohol modified, although the non-alkylated resins may be utilized. Amongst the alcohol modifiers that one may use are methanol, ethanol, propanol, butanol and the like. The amount of aminoplast resin used with the alkyd resins of the present invention will differ in great measure upon the ultimate application to which the resinous composition is to be put. For instance, the range of aminoplast resin to alkyd may vary between 70:30 and 30:70 parts by weight of resin solids, respectively. For making laminates, the amount of aminoplast to alkyd resin may be varied between about 70:30 and 50:50, respectively. For films, such as in the coating resin art, one would use about 30 parts of the aminoplast resin to 70 parts of the alkyd resin, although one could employ the two components in equal parts by weight.

In the preparation of the alkyd resins of the present invention alone, or with the aminoplast resins, it is generally desired to utilize an inert organic solvent, many of which are well known in the art in this general field such as xylol, butanol and mixtures of xylol and butanol and the like. The amount of solvent which is used differs primarily on the desired viscosity. Where more viscous solutions are desired, the solvent medium is kept at a minimum whereas when low viscosity solutions are desired, such as in spraying, rather substantial amounts of the solvent may be used.

It should have been noted in some of the preceding examples that the alkyd resin was prepared by using a plurality of polyhydric alcohols, some of which are conventionally used in the art such as glycerol, pentaerythritol, trimethylol propane and the like. This is accomplished principally for the purpose of adding to the reaction sphere, a polyhydric alcohol having a functionality greater than 2. If the polyhydric alcohol which is a part of the essence of the present invention is a difunctional alcohol, only linear polyesters will be produced. However, by adding a polyhydric alcohol having a functionality greater than 2, the alkyd resin produced will have thermosetting characteristics.

We claim:

1. A process for preparing an alkyd resin comprising heat reacting a member selected from the group consisting of phthalic acid and phthalic anhydride with a polyhydric alcohol having the formula:

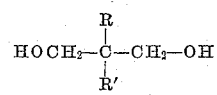

wherein R is a member of the group consisting of a —CH$_2$OH group, an alkyl group and an aryl group, R′ is a member of the group consisting of alkyl and aryl groups, wherein the number of carbon atoms in R and R′ totals at least 6.

2. A process for preparing an alkyd resin comprising heat reacting a member selected from the group consisting of phthalic acid and phthalic anhydride with 2-ethyl, 2-butyl-propanediol-1,3.

3. A process for preparing an alkyd resin comprising heat reacting a member selected from the group consisting of phthalic acid and phthalic anhydride with 2-methylol, 2-hexylpropanediol-1,3.

4. A process for preparing an alkyd resin comprising heat reacting a member selected from the group consisting of phthalic acid and phthalic anhydride with 2-methylol-2-amylpropanediol-1,3.

5. A process for preparing an alkyd resin comprising heat reacting a member selected from the group consisting of phthalic acid and phthalic anhydride with 2-methylol-2-octylpropanediol-1,3.

6. A process for preparing an alkyd resin comprising heat reacting a member selected from the group consisting of phthalic acid and phthalic anhydride with 2,2-dipropylpropanediol-1,3.

7. An alkyd resin comprising the heat reaction product of a member selected from the group consisting of phthalic acid and phthalic anhydride with a polyhydric alcohol having the formula:

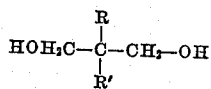

wherein R is a member of the group consisting of a —$CH_2OH$ group, an alkyl group and an aryl group, R' is a member of the group consisting of alkyl and aryl groups, wherein the number of carbon atoms in R and R' totals at least 6.

8. An alkyd resin comprising the heat reaction product of phthalic anhydride and 2-ethyl-2-butylpropanediol-1,3.

9. An alkyd resin comprising the heat reaction product of phthalic anhydride and 2-methylol-2-hexylproanediol-1,3.

10. An alkyd resin comprising the heat reaction product of phthalic anhydride and 2-methylol-2-amylpropanediol-1,3.

11. An alkyd resin comprising the heat reaction product of phthalic anhydride and 2-methylol-2-octylpropanediol-1,3.

12. An alkyd resin comprising the heat reaction product of phthalic anhydride and 2,2-dipropylpropanediol-1,3.

13. A composition of matter comprising a mixture of from 70 to 30 parts of (1) an alkyd resin comprising the heat reaction product of a member selected from the group consisting of phthalic acid and phthalic anhydride with a polyhydric alcohol having the formula:

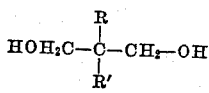

wherein R is a member of the group consisting of a —$CH_2OH$ group, an alkyl group and an aryl group, R' is a member of the group consisting of alkyl and aryl groups, wherein the number of carbon atoms in R and R' totals at least 6, and correspondingly from 30 to 70 parts of (2) a thermosetting aminoplast resin.

14. A composition of matter comprising a mixture of from 70 to 30 parts of (1) an alkyd resin comprising the heat reaction product of a member selected from the group consisting of phthalic acid and phthalic anhydride with a polyhydric alcohol having the formula.

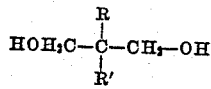

wherein R is a member of the group consisting of a —$CH_2OH$ group, an alkyl group and an aryl group, R' is a member of the group consisting of alkyl and aryl groups, wherein the number of carbon atoms in R and R' totals at least 6, and correspondingly from 30 to 70 parts of (2) a melamine-formaldehyde resin.

15. A composition of matter comprising a mixture of from 70 to 30 parts of (1) an alkyd resin comprising the heat reaction product of a member selected from the group consisting of phthalic acid and phthalic anhydride with a polyhydric alcohol having the formula:

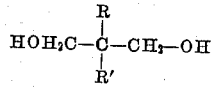

wherein R is a member of the group consisting of a —$CH_2OH$ group, an alkyl group and an aryl group, R' is a member of the group consisting of alkyl and aryl groups, wherein the number of carbon atoms in R and R' totals at least 6, and correspondingly from 30 to 70 parts of (2) a benzoguanamine-formaldehyde resin.

16. A composition of matter comprising a mixture of from 70 to 30 parts of (1) an alkyd resin comprising the heat reaction product of a member selected from the group consisting of phthalic acid and phthalic anhydride with a polyhydric alcohol having the formula:

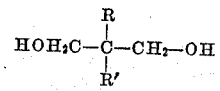

wherein R is a member of the group consisting of a —$CH_2OH$ group, an alkyl group and an aryl group, R' is a member of the group consisting of alkyl and aryl groups, wherein the number of carbon atoms in R and R' totals at least 6, and correspondingly from 30 to 70 parts of (2) an urea-formaldehyde resin.

17. A composition of matter comprising a mixture of from 70 to 30 parts of (1) an alkyd resin comprising the heat reaction product of phthalic anhydride and 2-ethyl-2-butylpropanediol-1,3 and correspondingly from 30 to 70 parts of (2) a butanol modified melamine-formaldehyde resin.

18. A composition of matter comprising a mixture of from 70 to 30 parts of (1) an alkyd resin comprising the heat reaction product of phthalic anhydride and 2-ethyl-2-butylpropanediol-1,3 and correspondingly from 30 to 70 parts of (2) a butanol modified benzoguanamine-formaldehyde resin.

19. A composition of matter comprising a mixture of from 70 to 30 parts of (1) an alkyd resin comprising the heat reaction product of phthalic anhydride and 2-ethyl-2-butylpropanediol-1,3 and correspondingly from 30 to 70 parts of (2) a butanol modified urea-formaldehyde resin.

References Cited in the file of this patent

UNITED STATES PATENTS

| | | |
|---|---|---|
| 1,890,668 | Bradley | Dec. 13, 1932 |
| 2,238,684 | Ellis | Apr. 15, 1941 |
| 2,281,415 | Coffman | Apr. 28, 1942 |
| 2,294,590 | West | Sept. 1, 1942 |
| 2,314,349 | Guth | Mar. 23, 1943 |
| 2,579,980 | Spencer | Dec. 25, 1951 |